United States Patent [19]
Nanba et al.

[11] Patent Number: 5,909,066
[45] Date of Patent: Jun. 1, 1999

[54] LINEAR MOTOR APPARATUS EMPLOYING LINEAR MOTOR AS DRIVE SOURCE

[75] Inventors: Katsuhiro Nanba, Okazaki; Masamitsu Ishiyama, Toyokawa; Tetsuya Kagawa, Toyokawa; Mitsutoshi Yagoto, Toyokawa; Makoto Izawa, Kariya; Toshio Kitaoka, Toyokawa; Yasuhiro Matsumoto, Toyokawa, all of Japan

[73] Assignee: Minolta Co., Ltd., Osaka, Japan

[21] Appl. No.: 08/623,714

[22] Filed: Mar. 29, 1996

[30] Foreign Application Priority Data

Mar. 31, 1995 [JP] Japan ...................................... 7-076847
Feb. 27, 1996 [JP] Japan ...................................... 8-039517

[51] Int. Cl.[6] .................................................. H02K 41/00
[52] U.S. Cl. .............................................. 310/12; 399/208
[58] Field of Search ................................ 310/12, 13, 14; 318/135; 399/208, 211, 212

[56] References Cited

U.S. PATENT DOCUMENTS

| | | | |
|---|---|---|---|
| 4,837,467 | 6/1989 | Newman | 310/12 |
| 4,839,543 | 6/1989 | Beakley et al. | 310/12 |
| 4,922,143 | 5/1990 | Gosdowski et al. | 310/12 |
| 4,958,115 | 9/1990 | Miller | 310/12 X |
| 5,081,381 | 1/1992 | Narasaki | 310/12 |
| 5,107,157 | 4/1992 | Ito | 310/12 |
| 5,179,304 | 1/1993 | Kenjo et al. | 310/12 |
| 5,191,377 | 3/1993 | Kaguira et al. | 399/90 |
| 5,225,725 | 7/1993 | Shiraki et al. | 310/12 |
| 5,229,670 | 7/1993 | Kagawa | 310/12 |
| 5,325,005 | 6/1994 | Denk | 310/68 |
| 5,332,955 | 7/1994 | Hopper | 318/632 |
| 5,338,121 | 8/1994 | Kobayashi et al. | 110/12 X |
| 5,559,378 | 9/1996 | Oudet et al. | 310/17 |
| 5,571,284 | 11/1996 | Kawamichi et al. | 310/12 |
| 5,587,636 | 12/1996 | Bar-Kana et al. | 318/561 |

FOREIGN PATENT DOCUMENTS

| | | | |
|---|---|---|---|
| 53-147219 | 12/1978 | Japan . | |
| 58-36162 | 3/1983 | Japan . | |
| 59-121036 | 7/1984 | Japan . | |
| 61-9161 | 1/1986 | Japan . | |
| 62-207168 | 9/1987 | Japan . | |
| 63-180443 | 7/1988 | Japan . | |
| 0249459 | 10/1988 | Japan | 310/12 |
| 2-65656 | 3/1990 | Japan . | |
| 6-225513 | 8/1994 | Japan . | |
| 2235783 | 3/1991 | United Kingdom | 310/12 |

OTHER PUBLICATIONS

"Linear–Motion Electrical Machines", E.R. Laithwaite, Proceedings of the IEEE, vol. 58, No. 4, Apr. 1970.

*Primary Examiner*—Nestor Ramirez
*Assistant Examiner*—Judson H. Jones
*Attorney, Agent, or Firm*—Burns, Doane, Swecker & Mathis, L.L.P.

[57] ABSTRACT

A linear motor includes a rod-like stator having a field magnet, and a movable piece having an armature coil fitted around the field magnet and arranged inside a cylindrical movable piece yoke. The movable piece is provided at its opposite ends with bearings. The armature coil is arranged between the bearings. The cylindrical movable piece yoke is provided at ends of a lower portion in the gravity direction with projections extending in the movable piece moving direction.

22 Claims, 11 Drawing Sheets

Fig. 12 (A) (Prior Art)
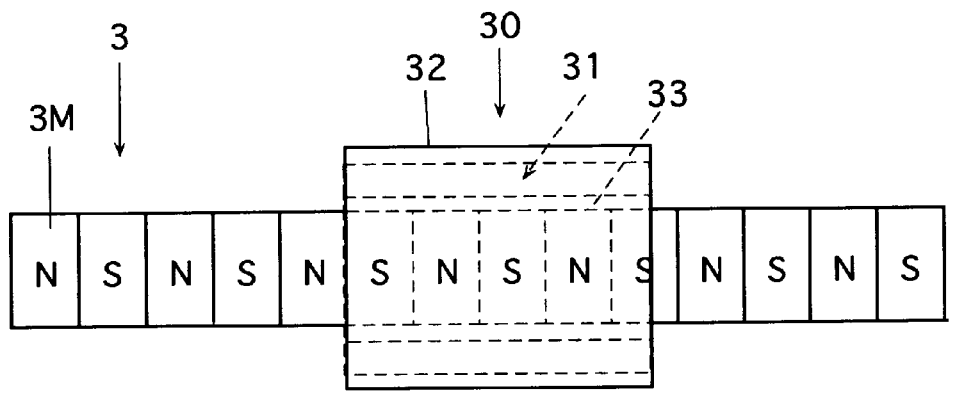
Fig. 12 (B) (Prior Art)
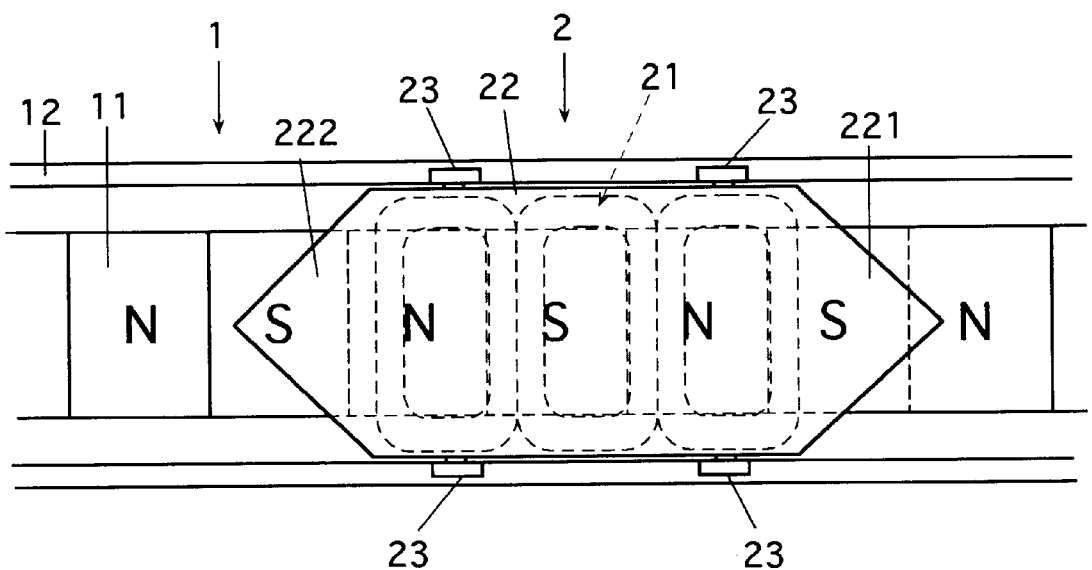

LINEAR MOTOR APPARATUS EMPLOYING LINEAR MOTOR AS DRIVE SOURCE

BACKGROUND OF THE INVENTION

1. Field of the Invention

The present invention relates to a linear motor provided with a rod-like stator having a drive field magnet extending in a uniform direction and a movable piece having an armature coil fitted around the field magnet.

2. Description of the Background Art

As shown in FIG. 12(A), conventional shaft type linear motor includes a rod-like stator 3 having a filed magnet 3M which is provided at its surface with N- and S-poles aligned alternately to each other in a uniform direction, and a movable piece 30 having an armature coil 31 arranged around a cylindrical member 33 which is made of plastics and fitted around the stator 3. The armature coil 31 is accommodated in a cylindrical movable piece yoke 32, and the plastic cylindrical member 33 is provided at its inner surface with a plurality of unillustrated guide projections which are in slidable contact with the field magnet.

The linear motor of the type, which includes the rod-like stator having the field magnet extending in a predetermined direction and the armature coil fitted around the field magnet as described above, can utilize the rod-like stator as a guide member for the movable piece, and it is not necessary to provide additionally large or complicated guide means for the movable piece, so that the structure is simple. By this and other reasons, the linear motors of the above type have been utilized in various kinds of instruments.

For example, in image forming apparatuses such as a copying machine and image reading apparatuses such as an image scanner, it has been attempted to use the linear motors of the above type as a drive source of a scanning optical system for a document image.

In the linear motors of the above type, however, when the movable piece moves relatively to the stator, change of a load, i.e., cogging generates due to change of a magnetic attraction force which is applied from the drive field magnet (i.e., field magnet for driving) to an end of the movable piece yoke. This prevents a smooth movement of the movable piece.

Meanwhile, a structure shown in FIG. 12(B) is also conventionally known. In this structure, an armature coil 21 of a movable piece 2 is opposed to a plate-like stator 1 having a field magnet 11, and rollers 23 provided at a movable piece yoke 22 roll on a stator carrying base 12. In the linear motor of the above structure, the movable piece yoke 22 is provided at its front and rear ends 221 and 222 in its moving direction with triangular projections in order to suppress change of a magnetic attraction force acting on the ends of the movable piece yoke 22.

In the linear motor of the flat type described above, however, the attraction force by the field magnet 11 acts on the movable piece yoke 22 in the same direction as the gravity, so that an excessively large load is applied to the portions movably carrying the movable piece 2. In addition to the above, the projections formed at the ends of the movable piece yoke 22 increase the whole area of the movable piece yoke 22, which further increases the attraction force acting on the yoke in the gravity direction, and thus the load further increases.

The linear motors of the shaft type also suffer from the following problem. In order to allow movement of the movable piece along the rod-like stator, there is arranged the plastic cylindrical member provided at its inner surface with a plurality of projections which are in slidable contact with the stator, and the armature coil is arranged around the cylindrical member, so that the cylindrical member operates as a kind of bearings. However, it is practically difficult to manufacture the movable piece provided with the cylindrical member having the projections in view of precision and others. Further, arrangement of the armature coil around the cylindrical member causes such disadvantages that the cylindrical member forms an obstacle, and that the cylindrical member excessively increases a distance between the armature coil and the field magnet, so that it is difficult to obtain an effective driving force from a magnetic flux of the field magnet.

In the linear motor of the flat type, a large space is required for arranging the armature coil in the movable piece, which increases the sizes of the movable piece. Also, arrangement of the movable piece guide outside the stator and movable piece requires a dedicated or additional space, so that the whole sizes are liable to be large. Further, due to the arrangement of the armature coil, it inevitably has a portion which does not contribute to the driving force.

Accordingly, it is an object of the invention to provide a linear motor, which includes a rod-like stator having a drive field magnet extending in a uniform direction, and an armature coil fitted around the field magnet and covered with a movable piece yoke (e.g., the armature coil is arranged inside a cylindrical movable piece yoke), and can operate stably and accurately.

Another object of the invention is to provide a linear motor, which includes a rod-like stator having a drive field magnet extending in a uniform direction and a movable piece being reciprocatable along the stator and having an armature coil, and allows a compact structure, a high utilizing efficiency of a magnetic energy, and stable and accurate operation.

Still another object of the invention is to provide an apparatus in which the above linear motor according to the invention allowing a compact structure, and efficient, stable and accurate operation is employed as a drive source for a member to be driven to move for achieving a compact structure and improving an accuracy.

Here, the above "member to be driven to move" is, for example, a carriage carrying a lighting lamp, mirror or the like to be moved for image scanning in an image scanning optical system of an image reading apparatus in a copying machine, image scanner or the like, or is a printing head, a writing unit or the like in a printer. The above "apparatus" is, for example, the image reading apparatus or the printer.

SUMMARY OF THE INVENTION (1)

In order to achieve the above object, a linear motor according to an aspect of the invention includes a rod-like stator having a drive field magnet extending in a uniform direction, and a movable piece having an armature coil fitted around the field magnet and arranged inside a cylindrical movable piece yoke, the cylindrical movable piece yoke being provided at its lower portion in a gravity direction with a projected end(or projected ends) extending in a movable piece moving direction.

The cylindrical movable piece yoke typically has a circular section, but may have a polygonal section such as a square section, or another section.

The projected end or end projection of the movable piece yoke may selectively have various shapes such as a triangular shape, a square shape or a combination of a square shape and a triangular shape added to an end of the square portion, when the cylindrical movable piece yoke is viewed in a developed form. The triangular shape can be especially effective on reduction of so-called cogging due to change of the magnetic attraction force. The square shape can increase an area of the projection, so that the a large magnetic attraction force can act on it, and a load at a bearing portion can be further reduced because the attraction force acts oppositely to the gravity acting on the movable piece. The combination of the square shape and the triangular shape added to the end of the square portion can be expected to achieve both the suppression of the cogging and the reduction of the load against the bearing.

With respect to a height in the moving direction of the projection of the movable piece yoke (i.e., length in the moving direction of the movable piece), it is desirable that the height of the triangular projection is equal or nearly equal to a length Q of one magnet pole of the field magnet in the movable piece moving direction in order to suppress sufficiently the cogging. It is desirable that the square projection has a length in a peripheral direction of the yoke which is equal to ½ or less of the peripheral length πD of the movable piece yoke. If the length in the peripheral direction were larger than ½ of πD, an attraction force in the same direction as the gravity would act on a portion of the movable piece yoke. It is also desirable that a height of the square projection in the yoke moving direction (i.e., length in the movable piece moving direction) is equal to ½ or less of the magnet pole length Q (e.g., equal to or nearly equal to ½ of the magnet pole length Q) in order to cancel mutually the magnetic attraction forces at the respective ends. In the case of the combination of the square portion and the triangular portion added to its end, the followings are desirable by the same reasons as those already described individually in connection with the triangular and square portions. The length of the square portion in the yoke peripheral direction is equal to ½ or less of the peripheral length πD of the movable piece yoke, and the height (length in the movable piece moving direction) is equal to ½ or less of the magnet pole length Q(e.g., equal to Q/2 or nearly equal to Q/2). The triangular portion has a height (length in the movable piece moving direction) equal or nearly equal to Q.

The stator may include a rod-like member made of a material which is machinable and magnetizable, and may be provided with the field magnet formed by magnetizing the rod-like member. According to this structure of the stator, the rod-like stator can have a smooth surface, which allows smooth movement of the movable piece.

According to the linear motor of the invention, the stator serves also as a guide rod guiding the movable piece, and the movable piece can be moved along the stator.

The cylindrical movable piece yoke is provided at its lower portion in the gravity direction with the projected end(s) extending in the movable piece moving direction, so that it is possible to reduce change of the magnetic attraction force by the field magnet acting on the end(s) of the movable piece yoke, whereby a so-called cogging can be suppressed, and the reduction of the change of the attraction force is achieved with a reduced load against a bearing.

Since the load against the bearing is reduced, accuracy in the constant speed driving is improved, and a friction loss is reduced, which allows easy driving at a high speed. By these reasons, the operation can be performed stably and accurately. Further, noises can be small. Since the load against the bearing is reduced, the friction loss at the bearing is reduced. Therefore, a required energy can be reduced, and suppression of wear at the bearing improves the durability.

If the shape of the projection at the end of the lower portion of the movable piece yoke, which is viewed in a developed form of the movable piece yoke, has a triangular shape, of which height in the movable piece moving direction is equal or nearly equal to a length of one magnetic pole of the stator field magnet in the movable piece moving direction, the cogging can be especially suppressed.

The structure of the movable piece yoke, in which the end of the lower portion in the gravity direction is projected in the movable piece moving direction for suppressing the cogging, may be applied to other linear motors according to the invention provided with movable piece yokes.

In the structure in which the stator includes the rod-like member made from the machinable and magnetizable material, and the field magnet is formed by magnetizing the rod-like member, the rod-like member can have a smooth surface formed by machining, and magnetization is effected on the machined smooth surface, so that the movable piece guided by the rod-like member can move further smoothly. This structure of the stator can be applied not only to the linear motor described above but also to stators of other linear motors according to the invention which will be described later.

(2)

In order to achieve the above object, the present invention also provides a linear motor including a rod-like stator having a drive field magnet extending in a uniform direction, and a movable piece being reciprocatable along the stator and having an armature coil, wherein the movable piece has a pair of bearings fitted around the stator, and the armature coil is disposed between outer ends of the pair of bearings.

According to this linear motor, since the armature coil is disposed between the outer ends of the pair of bearings fitted around the stator, the weight of the armature coil can be distributed in a well-balanced manner to both the bearings, so that the movable piece can be driven stably and accurately while suppressing vibration and speed variation.

Since the armature coil is disposed between the outer ends of the pair of bearings, the movable piece can have a reduced size, and thus the motor can have a reduced size as a whole.

This will be described below further in detail. As shown in FIG. 11(A), in a structure where a movable piece ME having bearings α and β at its opposite ends is fitted to a stator SE for reciprocation, a size of the movable piece ME is large if an armature coil CE is arranged outside the bearings as represented by dotted line in the figure. Further, the coil is supported in a cantilever manner on a portion having the bearings α and β, so that remarkable imbalance occurs in a coil weight distribution with respect to the bearings α and β, and thus remarkably different sliding loads are applied from the bearings α and β to the stator SE. As a result, repetition of reciprocation of the movable piece ME causes different abrasion wears at the bearings α and β, so that the durability of one of the bearings is remarkably impaired, and vibration and speed variation occur during movement of the movable piece. Further, although both the bearings have to be fitted around the stator SE with a remarkably slight clearance therebetween, even if a large wear has not occurred at any of the bearings α and β, both the bearings α and β tilt with respect to the stator SE because of imbalance in the distribution of the coil weight to the bearings due to the cantilever-carrying of the coil CE. As a result, clearances at the bearings α and β with respect to the stator SE differ from each other, resulting in vibration and speed variation during movement of the movable piece.

In view of the above, the invention employs such a structure that the armature coil CE is arranged between the outer ends of both the bearings α and β as shown in FIG. 11(B), and particularly between the bearings α and β as represented by solid line in FIG. 11(A), so that the movable piece can have a reduced size, and the weight of the armature coil CE can be distributed to both the bearings in a well-balanced manner.

Owing to the above arrangement of the coil, the movable piece can be driven stably and accurately while suppressing vibration and speed variation during movement.

In the structure where the armature coil CE is arranged between the outer ends of the bearings α and β but radially outside the bearings as shown in FIG. 11(B), the coil CE is arranged on an outer periphery of a cylindrical member CX fitted around the bearings. In this case, a large space is formed between the coil CE and the field magnet of the stator SE due to a thickness in the radial direction of the bearing and others. Further, due to the cylindrical member CX existing as an obstacle, it is difficult to use effectively the magnetic flux of the field magnet for driving the movable piece ME. Meanwhile, in the structure where the armature coil CE is arranged between the bearings α and β as represented by solid line in FIG. 11(A), it is possible to reduce a space between the coil CE and the field magnet of the stator SE, and the cylindrical member forming the obstacle can be eliminated. Therefore, the magnetic flux of the field magnet can be effectively converted into a drive force for the movable piece, and thus the movable piece can be driven efficiently. In this case, a clearance between the armature coil CE and the stator SE is preferably 100 μm or less.

In the structure where the armature coil CE is disposed between the bearings α and β, the movable piece can have a further reduced size compared with the structure in FIG. 11(B).

In the linear motor having the pair of bearings described above, the movable piece can be accurately and easily assembled onto the stator owing to the pair of bearings, so that the whole motor can be manufactured precisely.

The features relating to the positional relationship between the bearings and the armature coil can be applied to linear motors employed in an image reading apparatus and a printer according to the invention, which will be described below.

The pair of bearings described above can be arranged at opposite ends of a bearing unit forming a portion of the movable piece. In this case, the armature coil can be disposed inside the unit.

The bearing unit may be provided with a movable piece yoke. The bearing unit may entirely or partially serve as the movable piece yoke.

The feature relating to the bearing unit can be applied to linear motors employed in the image reading apparatus and the printer according to the invention, which will be described below.

(3)

In order to achieve the above object, the present invention also provides an image reading apparatus, wherein a linear motor drives at least one of carriages carrying a member to be moved along a document table in an image scanning optical system, the linear motor includes a rod-like stator having a drive field magnet extending in a uniform direction, and a movable piece being reciprocatable along the stator and having an armature coil, the movable piece has a pair of bearings fitted around the stator, the armature coil is disposed between outer ends of the pair of bearings (e.g., particularly between the pair of bearings), and at least one of the carriages is coupled to the movable piece of the linear motor.

The above image reading apparatus can have a small size, a compact structure and a high image reading accuracy, because it uses the linear motor according to the invention as a driving source of the carriage.

Generally, the image scanning optical system in the image reading apparatus includes a first carriage carrying a lighting device for lighting a document image on a document table and a mirror for leading reflected light beams in a predetermined direction, and a second carriage for leading the image light coming from the first carriage to a position of an imaging lens or the like in a predetermined direction. For the image scanning, the first carriage is moved along the document table, and the second carriage is move in the same direction but at a half speed of the first carriage.

In this case, both the carriages may be driven by linear motors according to the invention. Alternatively, the first carriage may be driven by the linear motor according to the invention, and movement of the first carriage may be transmitted to the second carriage via an appropriate interlocking mechanism (such as a pulley transmission device including a belt, wire or the like, a gear transmission device, or an interlocking device including one or more of them).

For example, the image reading apparatus of the latter type may have the following structure. The interlocking mechanism includes a bearing unit guided for reciprocation by the stator of the linear motor for driving the first carriage and coupled to the second carriage, a pair of rotatable pulleys disposed at the opposite sides of the movable piece of the linear motor and carried by the bearing unit, and a wire member (such as a wire, belt or chain) retained around the pair of pulleys, and having opposite ends coupled to an apparatus body and an intermediate portion coupled to the movable piece.

In other words, the image reading apparatus wherein first and second carriages carrying members for optically scanning a document image are movable along a document table, and the second carriage is moved at a half speed of the first carriage for image scanning, includes:

a rod-like stator having a drive field magnet extending in a uniform direction, a movable piece including a pair of bearings fitted around the stator and an armature coil disposed between the pair of bearings, and coupled to the first carriage, a bearing unit fitted around the stator and coupled to the second carriage, a pair of pulleys rotatably carried by the bearing unit with the movable piece therebetween, and a wire member retained around the pair of pulleys, and having opposite ends coupled to an apparatus body and an intermediate portion coupled to the movable piece.

According to this apparatus, the carriage drive system can have a small and simple structure, which allows small and simple structure of the whole apparatus. The linear motor for driving the first carriage is the linear motor according to the invention, and thus can operate accurately. Further, only by driving this one motor, both the carriages are moved while maintaining a predetermined relative position relationship and a relative speed, so that the image reading accuracy can be high.

(4)

In order to achieve the above object, the present invention also provides a printer wherein a linear motor drives a write unit for performing writing on a record material, the linear motor includes a rod-like stator having a drive field magnet extending in a uniform direction, and a movable piece being reciprocatable along the stator and having an armature coil, the movable piece has a pair of bearings fitted around the stator, the armature coil is disposed between the outer ends of the bearings (e.g., particularly between the bearings), and the write unit is coupled to the movable piece of the linear motor.

Since this printer employs the linear motor according to the invention as a drive source of the write unit, it can have a small and compact structure, and can improve a printing/writing accuracy.

The linear motor of the above item (2), the linear motor in the image reading apparatus of the above item (3), and the linear motor in the printer of the above item (4) each provided with the armature coil disposed between the outer ends of the pair of bearings are desired to produce a large driving force for the movable piece. For this purpose, it is desirable that each of these motors is provided with a movable piece yoke covering entirely or partially the outer periphery of the armature coil. The movable piece yoke is desirably made of a magnetic material and more desirably a ferromagnetic material.

In each of the linear motor of the above item (2), the linear motor in the image reading apparatus of the above item (3), and the linear motor in the printer of the above item (4), the pair of bearings may be arranged at opposite ends of a bearing unit forming a portion of the movable piece, in which case the armature coil can be arranged inside the unit.

The above bearing unit may be provided with the movable piece yoke. The bearing unit may entirely or partially serve as the movable piece yoke. For example, a casing of the bearing unit may serve as the movable piece yoke made of a ferromagnetic material.

In any of the linear motors according to the invention including the linear motor of the above item (1), the stator may be provided with a non-magnetic portion for moving a magnetically adhering material (magnetic dust) allowing magnetic attraction and other adhering material (dust) toward the non-magnetic portion. The non-magnetic portion may be arranged, for example, at a longitudinal end of the stator. The movable piece may be provided with a cleaning member for cleaning the stator. The cleaning member is desirably adapted to clean the stator in accordance with movement of the movable piece and push the dust toward the non-magnetic portion. A magnet may be opposed to the non-magnetic portion on the stator for attracting and removing the magnetic dust moved thereto.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12(A) is a schematic side view of an example of a linear motor in the prior art; and FIG. 12(B) is a schematic plan of another example of a linear motor in the prior art.

DESCRIPTION OF THE PREFERRED EMBODIMENTS

Figure 1A:
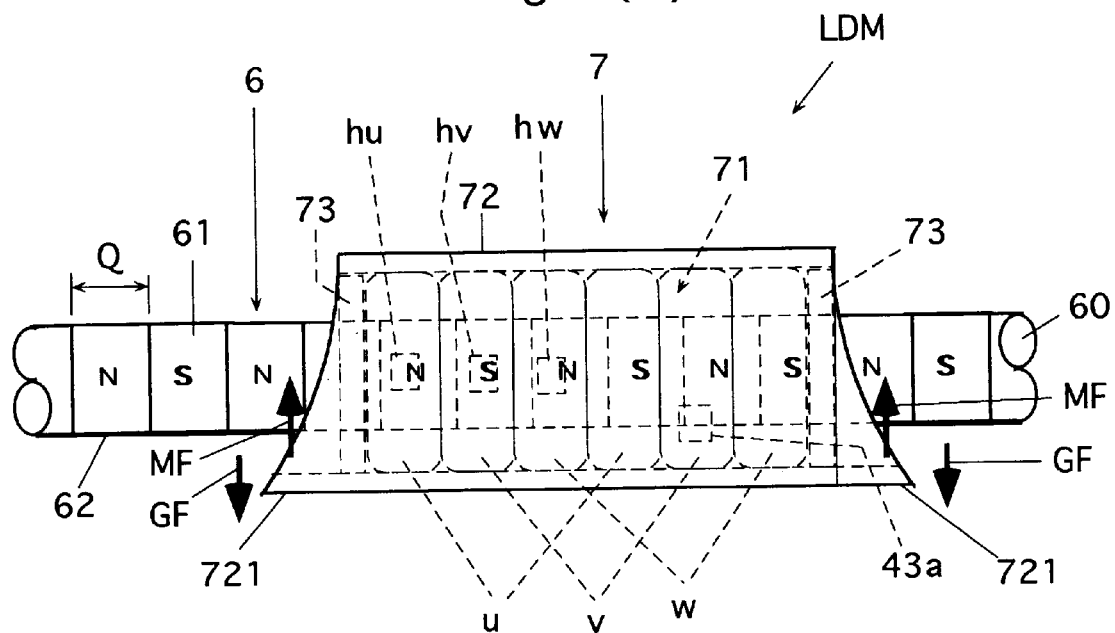
FIG. 1(A) is a side view of an example of a linear motor according to the invention.
Figure 1B:
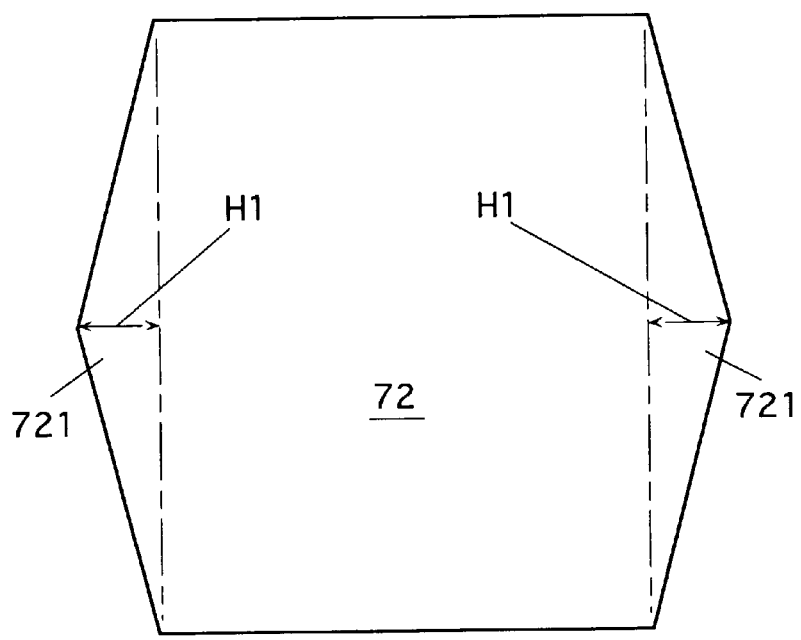
FIG. 1(B) is a development of a movable piece yoke of the motor in FIG. 1(A)

FIG. 1(A) is a side view of an example (linear motor LDM) of a linear motor according to the invention, and FIG. 1(B) is a development of a movable piece yoke of the motor in FIG. 1(A).

The linear motor LDM includes a rod-like stator 6 and a movable piece 7 fitted thereto for movement.

The stator 6 is formed of a rod-like member 60 made of a machinable and magnetizable material, which is machined to form a smooth surface and then is magnetized to form alternately arranged N- and S-poles and thereby form a field magnet 61 for driving the movable piece. The stator 6 has a circular section. In addition to the above, the rod-like member 60 is also provided with a fine magnet portion 62 formed for providing a magnetism to be read by an encoder for controlling a speed of the movable piece and others.

The fine magnet portion 62 is formed by magnetizing the portion to provide N- and S-poles with a fine pitch, and extend in the moving direction of the movable piece 7.

The movable piece 7 has an armature coil 71 fitted around the stator 6 with a predetermined space therebetween. A cylindrical movable piece yoke 72 is arranged outside the armature coil.

Figure 4A:
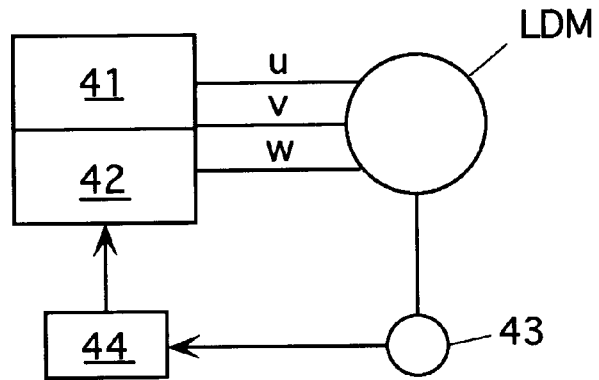
FIG. 4(A) is a block diagram schematically showing an operation control circuit of a linear motor.
Figure 4B:
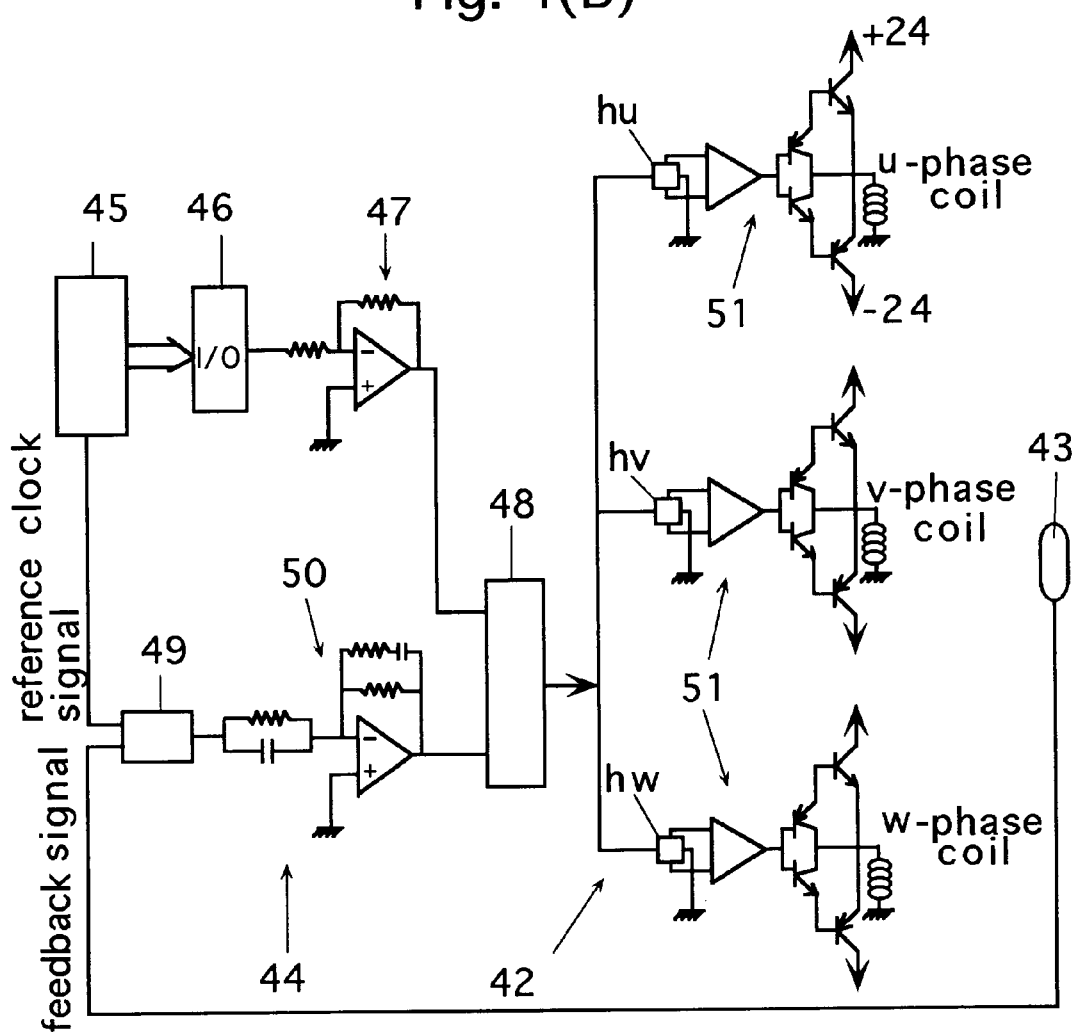
FIG. 4(B) shows a major portion of an operation control circuit including a speed control circuit operating in a phase synchronous method.

The armature coil 71 is formed of air-core coils u, v and w of three phases which are arranged at electrical angular positions shifted by an electrical angle of 2π/3 (or positions of the same phases as the positions shifted by 2π/3) from each other so that the motor can be driven in a three-phase driving manner to be described later. There are arranged position sensing elements for controlling supply of a current to the coils of the respective phases. Here, the position sensing elements are Hall elements which are a kind of magneto-electric conversion elements. For the u-phase coil, there is arranged the Hall element hu, and the Hall elements hv and hw are arranged for v- and w-phase coils, respectively. A magnetism sensor 43a sensing the magnetism of fine magnet portion 62 is arranged at the movable piece 7. The magnetism sensor 43a is one of components of an encoder 43 which is shown in FIGS. 4(A) and 4(B) and will be described later.

At opposite ends of the movable piece yoke 72, there are arranged bearings 73 with the armature coil therebetween. The bearings 73 allow reciprocation of the movable piece 7 along the stator 6.

This motor has such an important feature that opposite ends 721 of the lower portion in the gravity direction of the movable piece yoke 72 are provided with projections extending in the movable piece moving direction. Each of the projected ends is triangular in a development of the movable piece yoke 72 as shown in FIG. 1(B).

Each of the projected ends 721 has a height H1 in the movable piece moving direction, which is equal to a length Q in the movable piece moving direction of one of the magnet poles in the field magnet 61 of the stator 6.

According to the linear motor LDM described above, the movable piece driving force is generated by supplying a current through the armature coil 71 of the movable piece 7 as will be described later, and thereby the movable piece 7 is driven.

Accordingly, a carriage, which carries a member of a document image scanning optical system of an image reading apparatus in a copying machine, an image scanner or the like, may be coupled to the movable piece 7 for driving the carriage, whereby image scanning and reading can be performed. Alternatively, a write unit of a printer may be coupled to the movable piece 7 for driving the same.

In the linear motor LDM described above, the armature coil 71 is arranged between the pair of bearings 73 fitted around the stator 6, so that the weight of the armature coil can be distributed to these bearings 73 in a well-balanced manner, so that the movable piece 7 can be driven stably and precisely while suppressing vibration and speed variation.

Since the armature coil 71 is arranged between the pair of bearings 73, this structure reduces the size of the movable piece, and thus the motor LDM can have a reduced size as a whole.

The cylindrical movable piece yoke 72 and the bearings 73 at the opposite ends thereof form a so-called bearing unit, and this bearing unit can be easily and precisely assembled to the stator 6, so that the motor LDM can be manufactured precisely as a whole.

Owing to arrangement of the armature coil 71 between the pair of bearings 73, the armature coil 71 is located near the field magnet 61 of the stator 6, so that the magnetic flux of the field magnet 61 can be effectively converted into the movable piece driving force.

Provision of the movable piece yoke 72 can form a magnetic circuit producing such a loop that the magnetic flux generated at the field magnet 61 reaches the movable piece yoke through the armature coil 71, and further returns from the movable piece yoke 72 to the coil 71. Therefore, the magnetic flux generating at the field magnet 61 can be effectively converted into the movable piece driving force without a loss.

Further, the ends 721 of the lower portion in the gravity direction of the movable piece yoke 72 are provided with the triangular projections, which extend in the movable piece moving direction and each have the height H1 equal to the magnetic pole length Q. Therefore, it is possible to suppress effectively variation of the magnetic attraction force of the field magnet 61 acting on the ends of the movable piece yoke 72, which may be caused when the movable piece yoke 72 is moved by the driving force. This suppresses the cogging phenomenon, and allows movement of the movable piece 7 in a desired manner.

Since an attraction force MF (FIG. 1(A)) by the field magnet 61 acts against the gravity GF (FIG. 1(A)) acting on the movable piece 7, the suppression of variation of the magnetic attraction force acting on the ends of the yoke is achieved with a reduced load against the bearings 73, which allows smooth travel of the movable piece 7.

Since the load against the bearing 73 is reduced as described above, it is possible to improve the accuracy in the constant speed driving of the movable piece. Also, the reduction of a friction loss can reduce a required energy, and can improve the durability. Further, this facilitates a high-speed driving, and reduces noises.

Figure 2A:
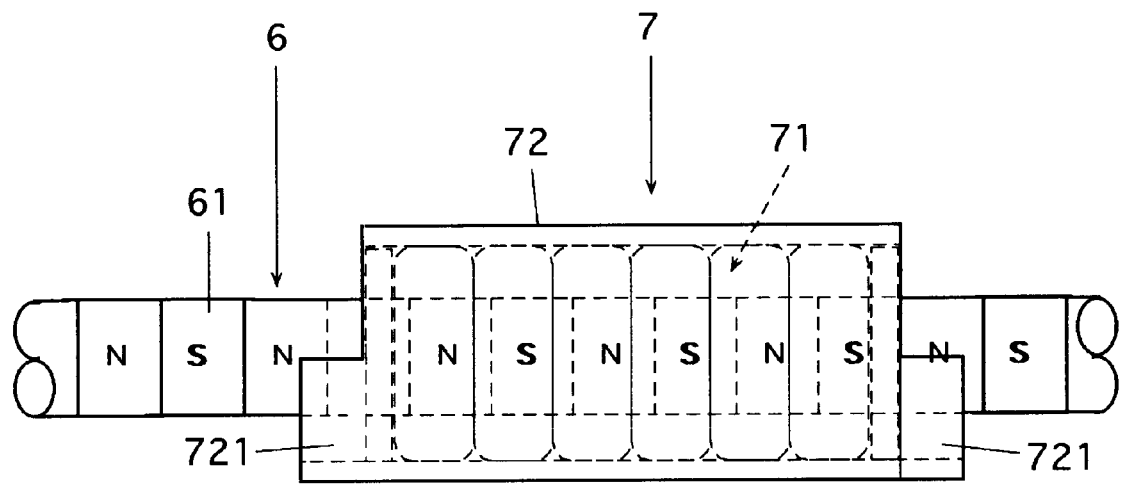
FIG. 2(A) is a side view of a linear motor of another embodiment of the invention.
Figure 2B:
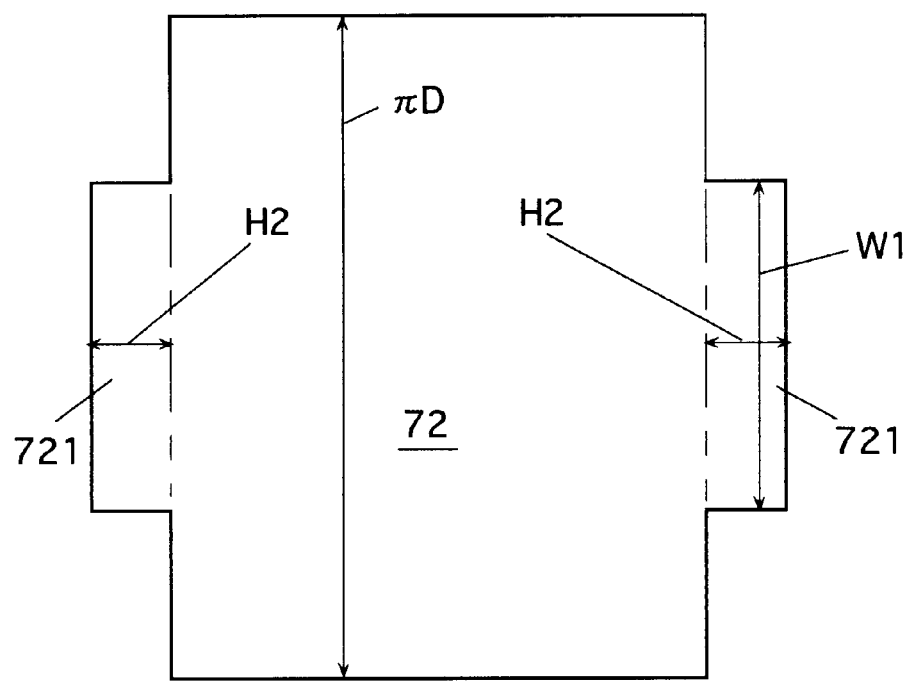
FIG. 2(B) is a development of a movable piece yoke of the motor in FIG. 2(A)

The shape of the lower end 721 of the movable piece yoke 72 is not restricted to the shape described above. For example, as shown in FIGS. 2(A) and 2(B), the ends of the movable piece yoke 72 may have a square shape in the development. Each end may have other shapes such as a combination of a square portion and a triangular portion added to the outer side thereof, as shown in FIGS. 3(A) and 3(B).

In the case of the square end shown in FIGS. 2(A) and 2(B), a height H2 of the square portion in the movable piece moving direction is equal to ½ or less of the magnetic pole length Q, and a width W1 thereof is equal to ½ or less of a circumferential length πD of the movable piece yoke.

Figure 3A:
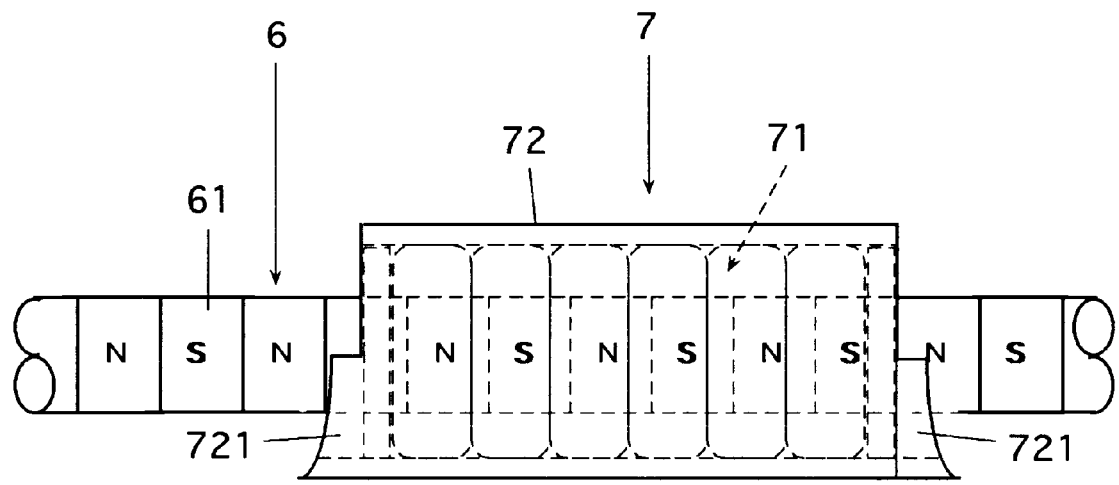
FIG. 3(A) is a side view of a linear motor of still another embodiment of the invention.
Figure 3B:
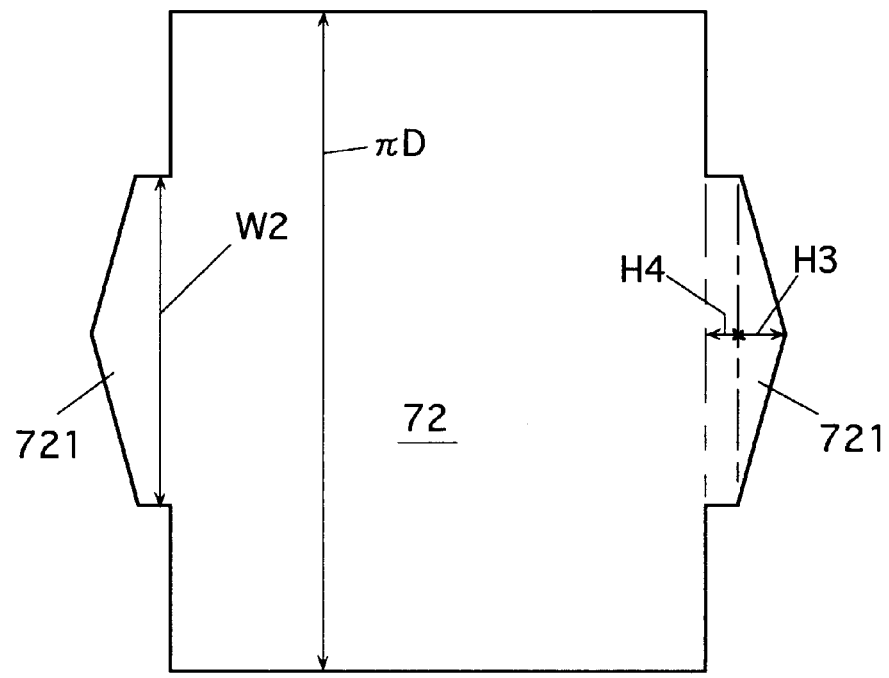
FIG. 3(B) is a development of a movable piece yoke of the motor in FIG. 3(A)

In the structure shown in FIGS. 3(A) and 3(B), a height H4 of the square portion is equal to ½ or less of the magnetic pole length Q and a width W2 thereof is equal to ½ or less of the yoke peripheral length πD, and a height H3 of the triangular portion is equal or nearly equal to one magnetic pole length Q of field magnet 61 in the movable piece moving direction.

The structures employing the above projections can achieve an effect similar to that by the movable piece yoke shown in FIG. 1(B).

However, the triangular shape shown in FIG. 1(B) can suppress the cogging especially effectively. The shape in FIG. 2(B) can increase an area, and thus can increase the magnetic attraction force, so that the load against the bearings 73 can be reduced.

The shape in FIG. 3(B) can be expected to suppress the cogging and reduce the load against the bearings.

Now, control of operation of the linear motor LDM will be described below.

As already described, the field magnet 61 of the stator 6 prepared by magnetization has a distribution of the magnetic flux density in a sinusoidal wave form in which N- and S-poles form one cycle. Also, the armature coil 71 of the movable piece 7 is formed of the three phase coils u, v and w which are arranged at positions shifted by an electrical angle of $2\pi/3$ (or positions of the same phases as the positions shifted by $2\pi/3$) from each other. The movable piece 7 is provided with the Hall elements hu, hv and hw which are the position sensing elements. Each Hall element senses a magnitude and a direction of the magnetic flux of the field magnet 61 at the position thereof. A current, of which magnitude and direction correspond to the magnitude and direction of the magnetic flux sensed by the Hall element, is suppled to the corresponding coil to operate the motor LDM. Thus, a so-called three-phase driving manner is employed, and signals of phases shifted by 120 degrees from each other are supplied to the coils, whereby a constant driving force can be obtained regardless of the position of the movable piece. In this embodiment, the three-phase driving method is employed, and, for driving the movable piece at an intended speed, a phase-locked-loop servocontrol method, which is generally called a PLL, is employed.

FIG. 4(A) is a schematic block diagram showing an electric circuit for operation control of the motor LDM, and FIG. 4(B) shows a major portion of the operation control circuit including a speed control circuit which employs the phase-locked-loop servocontrol method.

In FIGS. 4(A) and 4(B), 41 indicates a DC current source, 42 indicates a current supply control circuit including the Hall elements and others, 43 indicates an encoder sensing the moving speed of the movable piece 7, and 44 indicates a speed controller employing the phase-locked-loop servocontrol method. The encoder 43 is a magnetic encoder including a magnetic sensor 43a (see FIG. 1(A)), which is formed of a magnetic resistance element called an MR element and can move together with movable piece 7 along the fine magnet portion 62 formed at the stator 6, although it is not restricted to this.

In FIG. 4(B), 45 indicates a computer which instructs predetermined operations of the motor LDM and issues a reference clock signal to a phase synchronous controller 49. 46 indicates an I/O port of the computer 45, 47 indicates an amplifier, 48 indicates a switch portion, 49 indicates the phase synchronous controller, 50 indicates a compensation circuit, and 51 indicates an amplifier circuit.

According to the control circuit shown in FIGS. 4(A) and 4(B), the computer 45 issues the reference clock signal corresponding to an intended speed to the phase synchronous controller 49, and the encoder 43 feed back a moving speed signal of the movable piece 7 to the controller 49. The phase synchronous controller 49 issues a signal, which corresponds to a frequency difference and a phase difference between the pulse of the reference clock and the pulse of the feedback signal sent from the encoder 43, so that the compensating circuit 50 compensates a gain or delay in the transmission system, and the output voltage thereof is used as a reference input voltage of the Hall elements. As already described, the Hall element issues the voltage corresponding to the magnitude and direction of the magnetic flux at the position thereof, and the output voltage has such a characteristic that it is proportional to the reference input voltage. Therefore, the Hall element issues the output voltage corresponding to the difference between the reference clock signal and the feedback signal. The output voltage issued from the Hall element is proportionally amplified by the amplifier circuit 51, and is supplied to the armature coil. In this manner, the feedback signal can have the same frequency and phase as the pulse of the reference clock. In other words, the motor LDM is driven to attain the intended speed of the movable piece 7.

The motors shown in FIGS. 2(A) and 3(A) are controlled in a similar manner.

Still another embodiment of the invention will be described below.

Figure 5A:
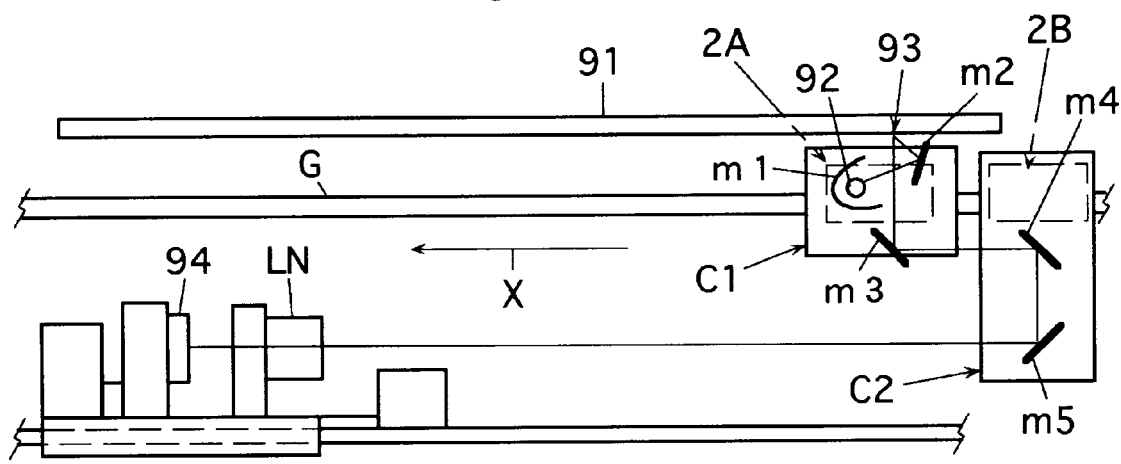
FIG. 5(A) is a schematic side view of an example of an image reading apparatus according to the invention.
Figure 5B:
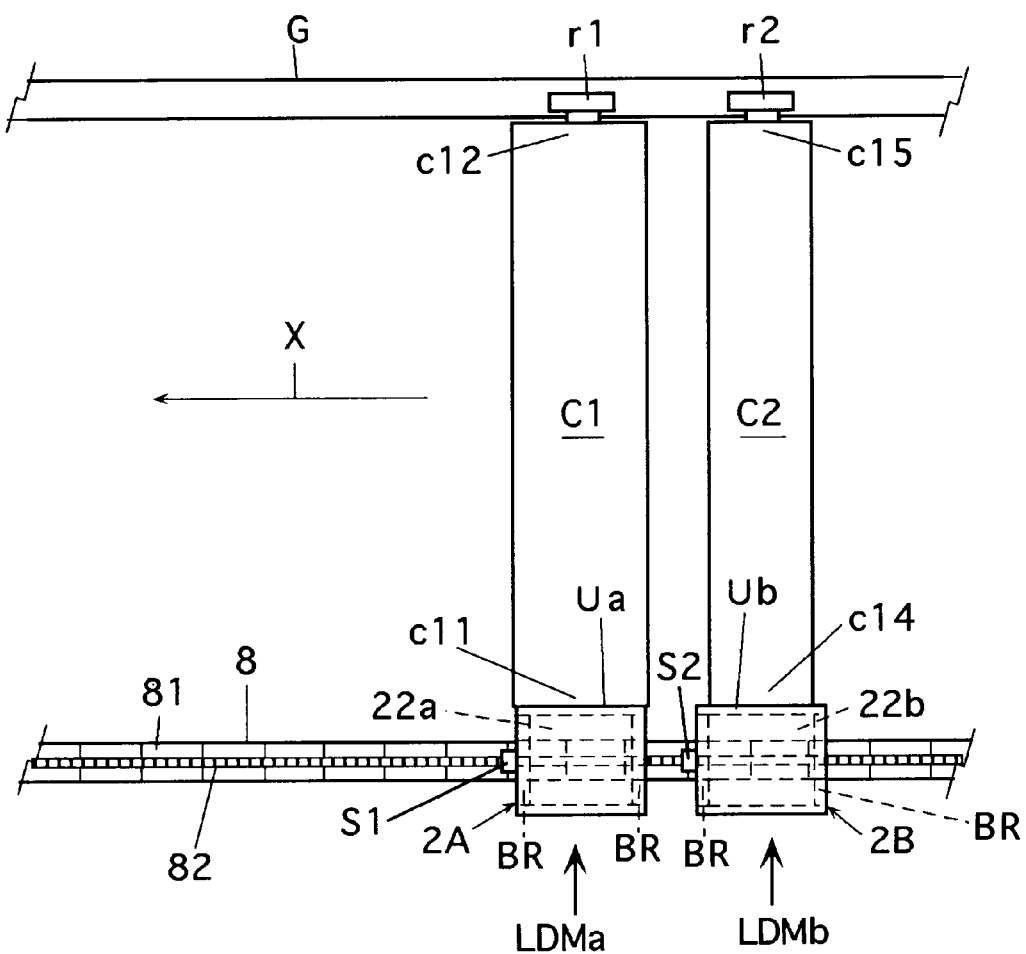
FIG. 5(B) is a schematic plan of the apparatus in FIG. 5(A)

FIGS. 5(A) and 5(B) show an image reading apparatus employing linear motors according to the invention as drive sources. FIG. 5(A) is a schematic side view, and FIG. 5(B) is a schematic plan. A linear motor parts for driving the carriages are not shown in FIG. 5(A) except for positions of the movable pieces 2A and 2B represented by chain line.

In the image reading apparatus, a lighting lamp 92 is arranged under a document table glass 91 on which a document is put. Light beams emitted from this lamp are reflected by reflection mirrors m1 and m2, and are gathered at an image reading position 93 on the glass 91. The reflected light beams of the document are reflected by a mirror m3 and a set of mirrors m4 and m5, and pass through a lens LN to form an image at a CCD camera 94 which is a linear camera element.

The lamp 92 as well as the mirrors m1, m2 and m3 are mounted on a movable carriage C1. Mirrors m4 and m5 are mounted on a movable carriage C2. In the image reading operation, the carriage C1 moves to drive the lamp 92 and the mirrors m1, m2 and m3 in a document image secondary scanning direction X, and the carriage C2 moves to drive the mirrors m4 and m5 in the same direction X. In this operation, the lamp 92 and the mirrors m1, m2 and m3 are driven at a speed, of which ratio to the driving speed of the mirrors m4 and m5 is 2:1. Therefore, no change occurs in a distance from the image capturing position 93 to the lens LN, and thus a focused state is maintained. The image formed at the CCD camera 94 is photoelectrically converted to send the same to an unillustrated image processing circuit. In this manner, the reading operation is completed.

The magnification of image reading in the secondary scanning direction can be changed by adjusting the moving speed of the carriages C1 and C2, and the magnification in the primary direction can be changed by electrically processing image data issued from the CCD camera 94.

In the image reading apparatus, the carriage C1 is driven by a linear motor LDMa, and the carriage C2 is driven by a linear motor LDMb.

The linear motor LDMa driving the carriage C1 is formed of a rod-like stator 8 and a movable piece 2A fitted around the stator and guided thereby for movement. The carriage C1 has an end c11 coupled to the movable piece 2A, and a free end c12 thereof is provided with a roller r1 which is disposed on a guide rail G parallel to the stator 8 for allowing travel of the carriage.

The linear motor LDMb driving the carriage C2 includes the stator 8 and a movable piece 2B which is fitted around the stator and is guided thereby for travelling. The carriage C2 has one end c14 coupled to the movable piece 2B, and a free end c15 thereof is provided with a roller r2 which is disposed on the guide rail G for allowing travel of the carriage.

The stator 8 includes a movable piece drive field magnet 81, which is formed of a machinable and magnetizable material having a circular section and is provided with N- and S-poles formed in a later step, which poles are arranged alternately in the secondary scanning direction, and also includes a fine magnet portion 82 for the encoder.

Figure 6:
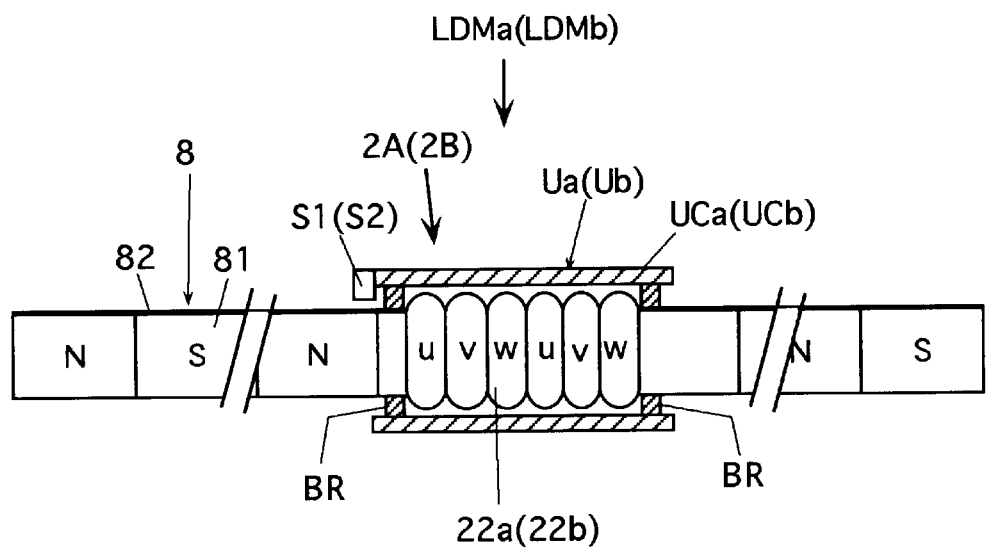
FIG. 6 is a cross section of the linear motor shown in FIG. 5(B)

The movable pieces 2A and 2B of the linear motors LDMa and LDMb have the same basic structure. As shown in FIG. 6, the movable piece 2A (2B) has a bearing unit Ua (Ub), and an annular armature coil 22a (22b) accommodated therein.

The bearing unit Ua (Ub) includes a pair of bearings BR arranged at opposite ends of a cylindrical bearing unit casing UCa (UCb). The pair of bearings BR are fitted around stator 8 for reciprocation with a slight clearance of 100 µm or less therebetween, so that the entire unit Ua (Ub) can reciprocate along the stator 8.

The bearing unit casing UCa (UCb) is made of iron (ferromagnetic material), and also serves as a movable piece yoke.

The armature coil 22a (22b) is arranged between the pair of bearings BR, is accommodated in the unit casing (movable piece yoke) UCa (UCb), and is fitted around the stator 8.

Each of the armature coils 22a and 22b is formed of three-phase coils u, v and w shifted from each other by an electrical angle of $2\pi/3$ (or arranged at the same positions as those shifted by $2\pi/3$). The movable piece 2A (2B) is provided with an unillustrated position sensing element. The position sensing element in this embodiment senses a magnitude and a direction of the magnetic flux of the field magnet 81 at the position thereof, and is formed of a Hall element which is a kind of magneto-electric converting element. A force for driving the movable piece 2A (2B) is generated by supplying a current of a magnitude and a direction corresponding to the magnitude and direction of the magnetic flux sensed by the Hall element.

As shown in FIGS. 5(B) and 6, the bearing unit casing UCa of the movable piece 2A is provided with a magnetic sensor S1 corresponding to the fine magnet portion 82 on the stator 8. The bearing unit casing UCb of the movable piece 2B is provided with a magnetic sensor S2 corresponding to the fine magnet portion 82. These magnetic sensors in this embodiment are magnetic resistance elements of a galvanomagnetic effect type called an MR element, and have a high sensitivity. The magnetic sensors form an encoder for controlling the position and speed of the movable piece together with the fine magnet portion 82.

A current is supplied to the armature coil 22a (22b) of the movable piece 2A (2B) through a control circuit similar to the motor operation control circuit operating in the three-phase drive manner and phase synchronous control manner shown in FIG. 4(B), so that, during the image scanning operation, the movable piece 2A (2B) is driven in the secondary scanning direction along the stator 8, and the movable piece 2B is driven in the secondary scanning direction at a half speed of the movable piece 2A. Thereby, during the image scanning, the carriages C1 and C2 are driven in the secondary scanning direction, and the carriage C2 is driven in the secondary scanning direction at a half speed of the carriage C1. In this manner, the document image is scanned, and the image reading is performed.

Although the linear motors shown in FIGS. 1(A), 2(A) and 3(A) as well as the linear motors LDMa and LDMb described above are three-phase motors, the linear motor according to the invention may be a single-phase motor or n-phase motor other the three-phase motor.

In the linear motor LDMa (LDMb) in the image reading apparatus described above, since the armature coil 22a (22b) is arranged between the pair of bearings BR fitted around the stator 8, the weight of the armature coil can be distributed to both the bearings BR in a well-balanced manner, so that vibration and speed variation of the movable piece 2A (2B) can be suppressed to attain the stable and precise driving.

Since the armature coil 22a (22b) is arranged between the pair of bearings BR, the movable piece 2A (2B) has a reduced radial size, so that it has a compact structure as a whole, and thus the motor has a reduced size as a whole.

The bearing unit Ua (Ub) forming the movable piece can be easily and precisely assembled to the stator 8, so that the whole motor LDMa (LDMb) can be manufactured precisely.

The armature coil 22a (22b) is located near the field magnet 81 of the stator 8, because it is arranged between the pair of bearings BR. Therefore, the magnetic flux of the field magnet 81 can be converted efficiently into the movable piece driving force. Further, provision of the movable piece yoke UCa (UCb) can form a magnetic circuit producing such a loop that the magnetic flux generated at field magnet 81 reaches the movable piece yoke through the armature coil 22a (22b), and further returns from the movable piece yoke UCa (UCb) to the coil 22a (22b). Therefore, the magnetic flux generating at the field magnet 81 can be effectively converted into the movable piece driving force without a loss.

The image reading apparatus employing the above linear motors LDMa and LDMb as the carriage drive source can have the small and compact structure owing to reduction of the size of the motors, and can achieve a high image reading accuracy because the motors can be accurately controlled.

Figure 7:
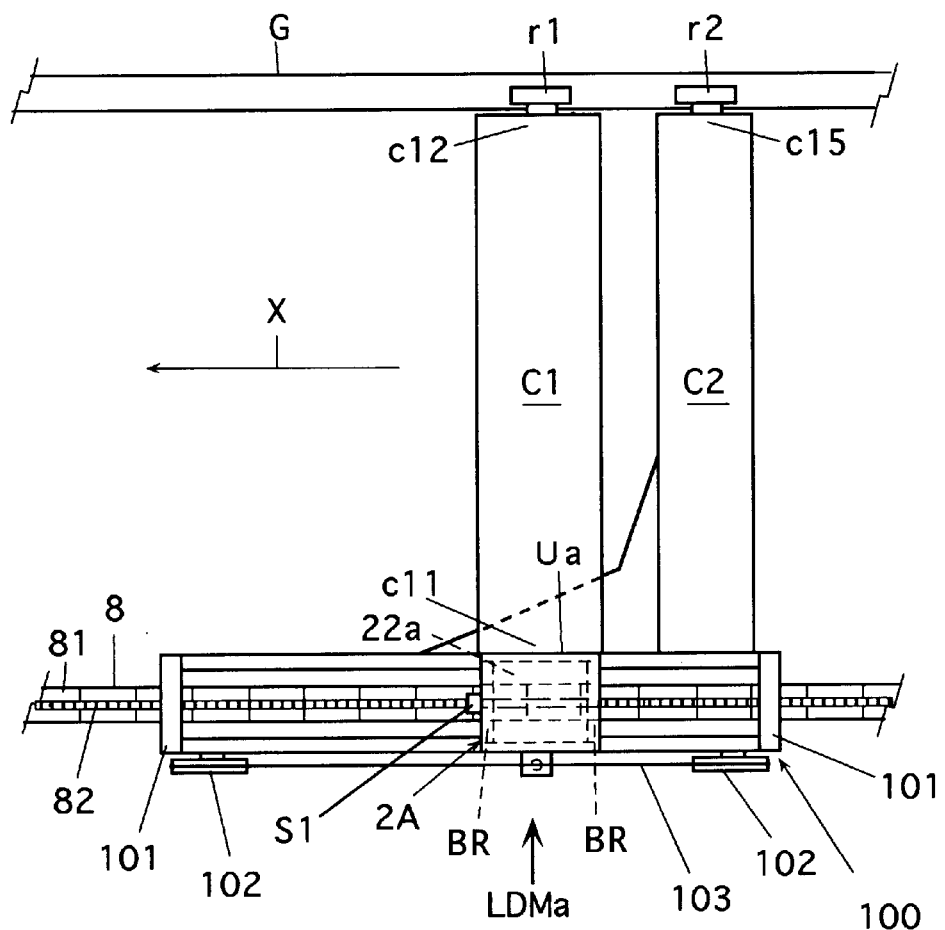
FIG. 7(A) is a schematic plan of another example of an image reading apparatus according to the invention.
FIG. 7(B) is a side view of a carriage interlocking mechanism in the apparatus in FIG. 7(A)
Figure 7:
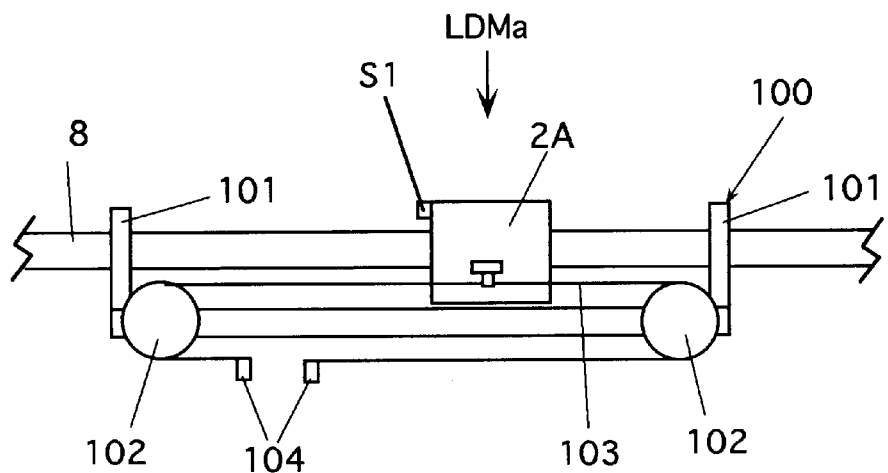

The second carriage C2 in the image reading apparatus described above may be driven by an interlocking mechanism shown in FIGS. 7(A) and 7(B) instead of the linear motor LDMb.

FIG. 7(A) is a schematic plan of the image reading apparatus employing the interlocking mechanism. FIG. 7(B) is a side view of a carriage interlocking mechanism portion.

The carriage C1 is driven by the same motor as the linear motor LDMa already described. Meanwhile, the carriage C2 is coupled to a bearing unit 100 interlocked to the movable piece 2A of the linear motor LDMa. The bearing unit 100 is provided at its opposite ends with bearings 101. These paired bearings 101 are located at opposite sides of the movable piece 2A, and are fitted around the stator 8 with a slight clearance for reciprocation along the stator 8. The unit 100 rotatably carries pulleys 102 at opposite sides of the movable piece 2A. A wire member 103 is retained around the pulleys 102. Each end of the wire member 103 is coupled to a member 104 fixed to a body of the image reading apparatus, and an intermediate portion of the wire member 103 is coupled to the movable piece 2A. Structures other than the driving mechanism for the carriage C2 are the same as those of the image reading apparatus shown in FIGS. 5(A) and 5(B). The same parts and portions bear the same reference numbers.

In this image reading apparatus, when the movable piece 2A is driven in the secondary direction, the interlocking mechanism operates to drive the bearing unit 100 in the same direction at a half speed of the movable piece 2A. In this manner, the linear motor LDMa drives the carriage C1, and thereby the carriage C2 is driven in the same direction, so that predetermined image scanning can be performed.

According to this image reading apparatus, the carriage driving system can have a compact and simple structure, so that the whole apparatus can have a compact and simple structure.

In the operation of reading the image, both the carriages C1 and C2 are driven by operating only one motor LDMa. Therefore, by precisely driving the motor LDMa, both the carriages can be driven precisely, and thus the image reading can be performed precisely.

Yet another embodiment of the invention will be described below.

Figure 8:
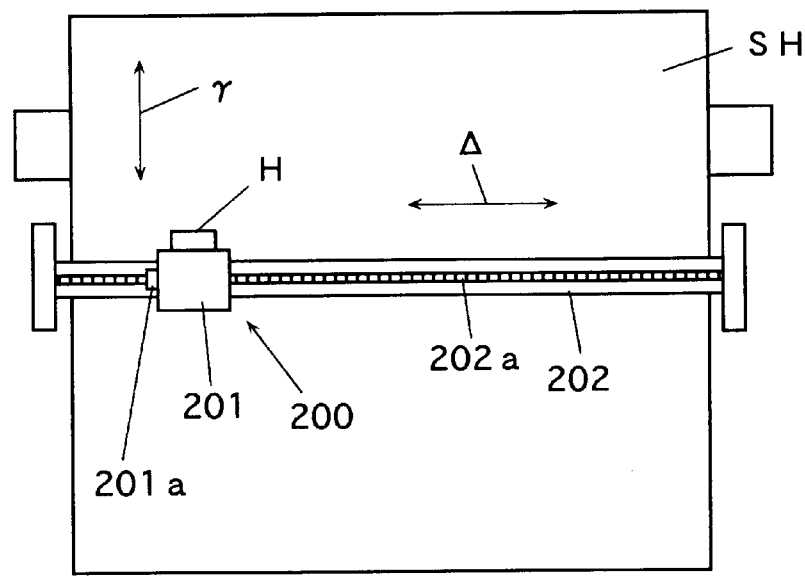
FIG. 8(A) is a schematic plan of an example of a printer according to the invention.
FIG. 8(B) is a schematic plan of another example (X-Y plotter) of a printer according to the invention.
Figure 8:
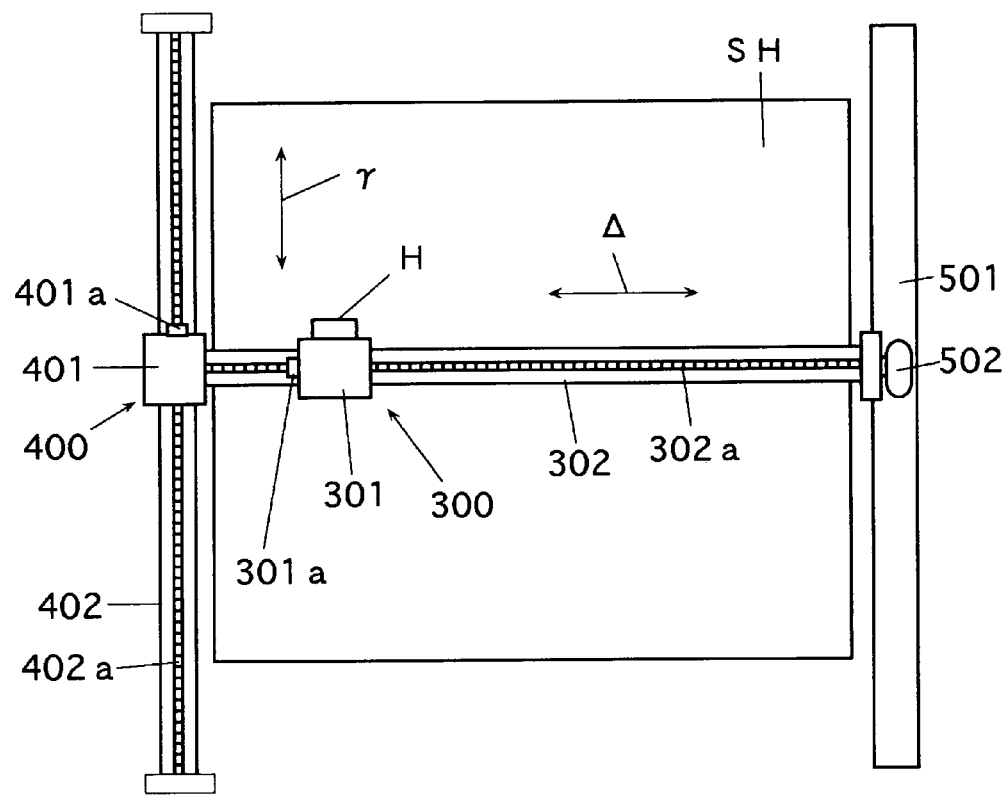

FIG. 8(A) is a plan of a printer employing a linear motor 200 of the substantially same structure as the linear motor LDMa, and FIG. 8(B) is a plan of a printer (X-Y plotter) employing linear motors 300 and 400 of the substantially same structure as the linear motor LDMa described above.

In the printer shown in FIG. 8(A), a recording material or medium SH is moved in a uniform direction γ, while a write unit (printing head) H is being driven in a direction Δ perpendicular to the direction γ. The write unit H is carried by a movable piece 201 of a linear motor 200. The movable piece 201 is fitted around a linear motor stator 202 extending in a direction Δ, and is driven along the stator. The linear motor 200 is provided with an encoder for controlling a position and a speed of the write unit H. The encoder is formed of a fine magnet portion 202a on the stator 202 and a magnetic sensor 201a mounted on the movable piece 201.

In a printer shown in FIG. 8(B), a recording material SH is unmoved, and the write unit (printing head) H is driven in the perpendicularly crossing directions γ and Δ. The write unit H is carried by a movable piece 301 of the linear motor 300. The movable piece 300 is fitted around a linear motor stator 302 extending in the direction Δ, and is driven along the stator. The stator 302 is coupled at one of its ends to a movable piece 401 of a linear motor 400, and is provided at the other end with a guide roller 502 rolling on a rail 501. In the motor 400, the movable piece 401 is fitted around a linear motor stator 402 extending in the direction γ, and is driven along the stator. The linear motors 300 and 400 are provided with encoders for controlling the position and speed of the write unit H. The encoder for the motor 300 is formed of a fine magnet portion 302a on the stator 302 and a magnetic sensor 301a mounted on the movable piece 301. The encoder for the motor 400 is formed of a fine magnet portion 402a on the stator 402 and a magnetic sensor 401a mounted on the movable piece 401.

Since these printers use the linear motors of the invention as the drive source of the write unit, these printers can have the small and compact structures, and can achieve a high printing and writing accuracy.

Each of the movable piece yokes of the linear motors LDMa and LDMb in the image reading apparatuses and the linear motors 200, 300 and 400 in the printers may be provided at the ends of the lower portion in the gravity direction with projections extending in the movable piece moving direction for suppressing the cogging, as is done in the movable piece yoke of the linear motor shown in FIG. 1(A) and others.

Figure 9A:
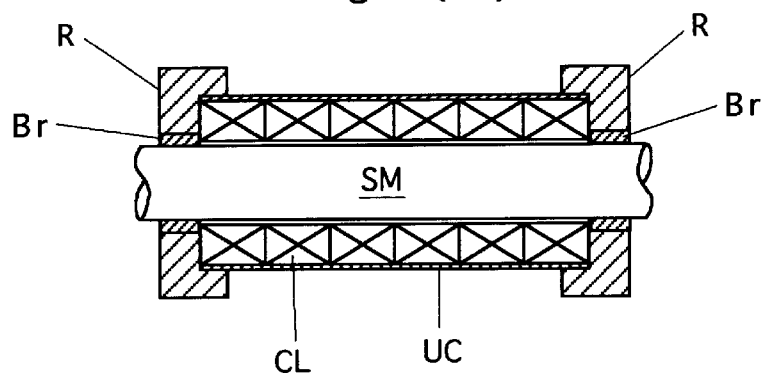
FIG. 9(A) is a cross section of a linear motor of yet another embodiment of the invention.
Figure 9B:
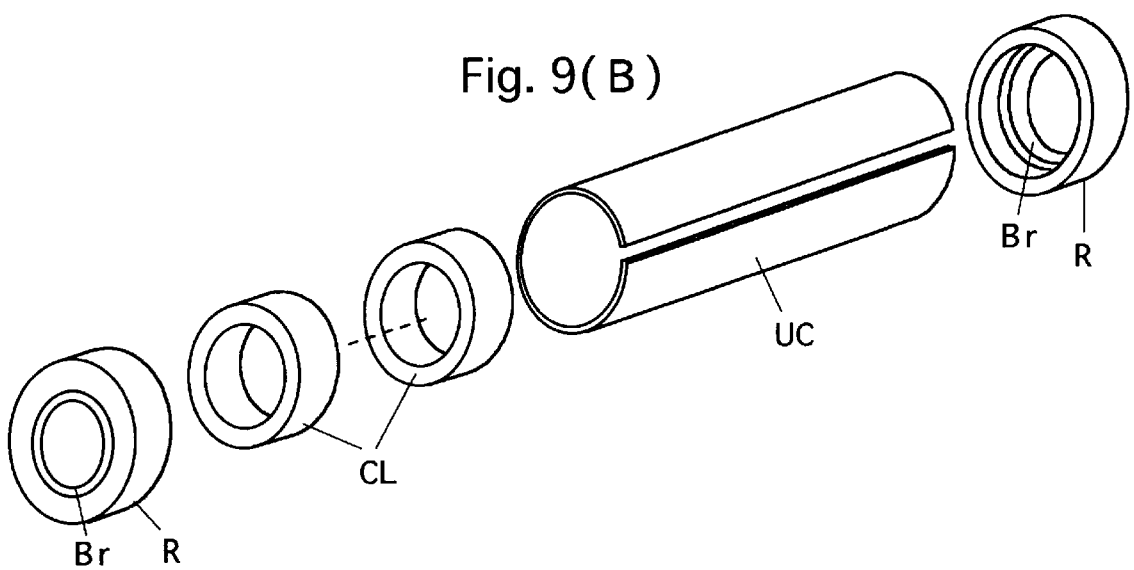
FIG. 9(B) is an exploded perspective view of a bearing unit in the motor.
Figure 9C:
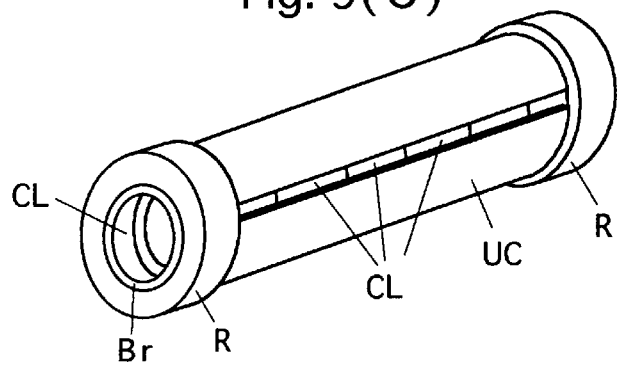
FIG. 9(C) is a perspective view of an assembled movable piece in the motor.
Figure 11A:
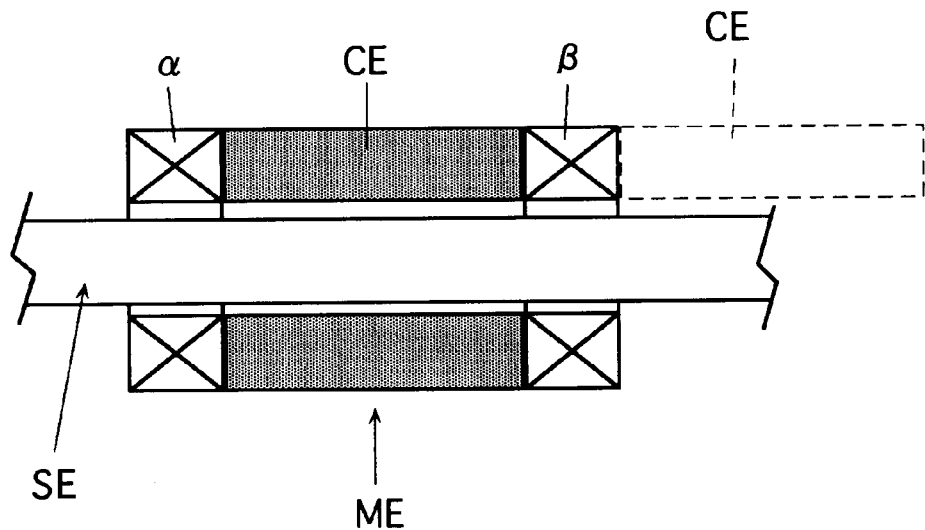
FIG. 11(A) shows an advantage of the linear motor according to the invention.
Figure 11B:
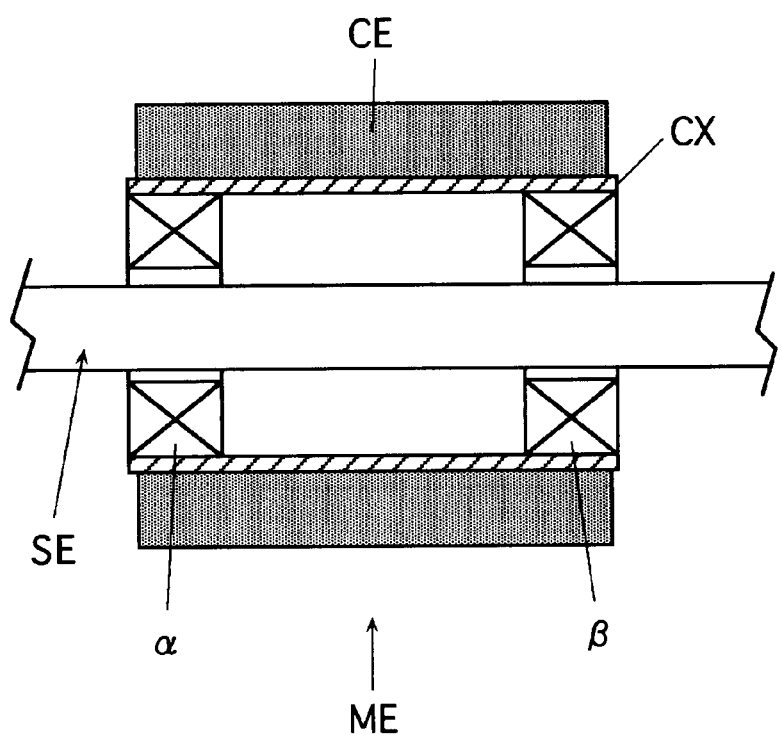
FIG. 11(B) also shows an advantage of the linear motor according to the invention.

Each of the movable pieces of the linear motors LDMa and LDMb in the image reading apparatuses and the linear motors 200, 300 and 400 in the printers may have a structure shown in FIGS. 9(A) to 9(C).

More specifically, it may have such a structure that armature coil CL to be fitted around a stator SM is surrounded by a cylindrical bearing unit casing UC made of a square plate in a development, and a pair of rings R provided at inner peripheries with bearings Br, which can be fitted around the stator SM for reciprocation, are fitted around the opposite ends of the casing UC for clamping the armature coils CL by the casing UC. The unit casing UC and the pair of rings R form a kind of bearing unit. Adhesive may be applied, if necessary, between the armature coil CL and the casing UC. This movable piece can reciprocate along the stator owing to the structure in which the bearings Br radially inside the rings R are fitted around the stator SM and the armature coil CL is fitted around the stator SM.

The linear motor employing the movable piece described above can achieve an effect similar to that by the linear motor LDMa and others already described, and can also achieve such an effect that the movable piece can be manufactured easily.

The unit casing UC may be made of a magnetic material and desirably a ferromagnetic material and thereby may be used as the movable piece yoke. In the motor employing the above movable piece, a uniform space between the movable piece yoke UC and the armature coil CL can be formed over an entire length, so that the movable piece driving force can be further stable.

Figure 10:
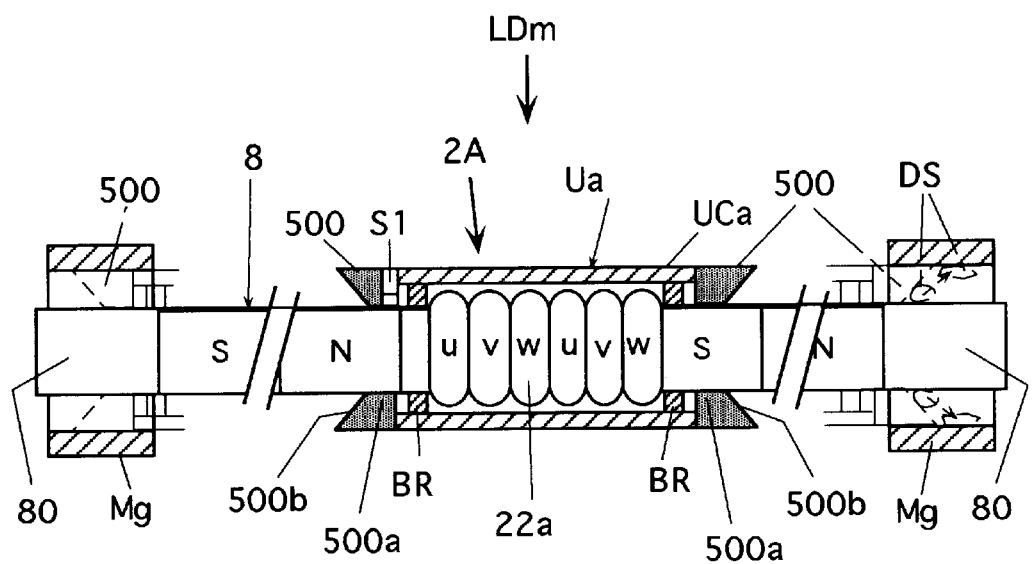
FIG. 10 is a cross section of a linear motor according to a further embodiment of the invention.

Each of the linear motors LDMa and LDMb in the image reading apparatus and the linear motors 200, 300 and 400 in the printers may have a structure which allows cleaning of dust on the stator as shown in FIG. 10.

A linear motor LDm shown in FIG. 10 has the same structure as the linear motor LDMa shown in FIG. 6 except for that non-magnetic portions 80 are arranged at longitudinally opposite ends of the stator 8, annular magnets Mg are opposed to the non-magnetic portions, respectively, and cleaning members 500 are arranged at the opposite ends of the bearing unit casing UCa of the movable piece 2A, respectively. The parts and portions similar to those of the linear motor LDMa in FIG. 6 bear the same reference numbers or characters.

The cleaning member 500 may be formed of a sufficiently slidable and desirably flexible solid synthetic resin or foam synthetic resin (e.g., flexible synthetic resin sponge), and is formed of a flexible sponge in this embodiment. The cleaning member 500 has an annular form as a whole, and has a portion 500a slidably fitted around the stator 8 and a portion 500b having a conical inner surface which diverges from the portion 500a toward an end of the stator. An outer diameter of the cleaning member 500 is equal to or slightly smaller than the inner diameter of the magnet Mg.

According to this linear motor LDm, when the cleaning members 500 at the movable piece 2A reciprocate along the stator 8, materials (dust) DS adhering to the stator 8 are pushed to the non-magnetic portions 80 of the stator 8, so that the stator 8 is cleaned. Magnetic dust in the dust DS moved to the non-magnetic portion 80 is attracted and removed by the magnet Mg. Since the stator 8 is cleaned in this manner, the abrasive wear can be suppressed, so that smooth movement of the movable piece 2A can be ensured for a long term.

The encoder employed in the linear motor according to the invention is not restricted to the magnetic encoder described before, and may be an encoder of another type such as an optical encoder. The encoder may be arranged on the linear motor as already described, and alternatively may be arranged outside the linear motor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor comprising:
    a rod-like stator having a drive field magnet extending in a uniform direction; and
    a movable piece having an armature coil fitted around said stator, said armature coil being arranged inside a cylindrical movable piece yoke; wherein
    said cylindrical movable piece yoke is provided at its lower portion in a gravity direction with a projected end extending in a movable piece moving direction.

2. A linear motor according to claim 1, wherein said projected end at the lower portion of said movable piece yoke is triangular.

3. A linear motor according to claim 2, wherein a length in the movable piece moving direction of said projected end is equal or nearly equal to a length of one magnet pole of said stator field magnet in the movable piece moving direction.

4. A linear motor according to claim 1, wherein said projected end at the lower portion of said movable piece yoke is square.

5. A linear motor according to claim 4, wherein said projected end has a length in the movable piece moving direction equal to ½ or less of one magnet pole length of said stator field magnet in the movable piece moving direction, and a length in a peripheral direction of said movable piece yoke equal to ½ or less of a peripheral length of said movable piece yoke.

6. A linear motor according to claim 1, wherein said projected end at the lower portion of said movable piece yoke has a shape of a combination of a square shape and a triangular shape added to an end of the square portion.

7. A linear motor according to claim 6, wherein said square portion has a length in the movable piece moving direction equal to ½ or less of one magnet pole length of said stator field magnet in the movable piece moving direction, and a length in a peripheral direction of said movable piece yoke equal to ½ or less of a peripheral length of said movable piece yoke, and said triangular portion has a length in the movable piece moving direction equal or nearly equal to a length of one magnet pole of said stator field magnet in the movable piece moving direction.

8. A linear motor according to claim 1, wherein said movable piece includes a pair of bearings fitted around said stator, and said armature coil is disposed between said pair of bearings.

9. A linear motor comprising:
a rod-like stator having a drive field magnet having permanent magnetism and extending in a uniform direction; and
a movable piece being reciprocatable along said stator and having an armature coil;
a pair of cleaning members which are each fitted around said stator, are in contact with said stator and move together with said moveable piece, said cleaning members being made of a non-magnetic material, said movable piece having a pair of bearings fitted around said stator, said armature coil being disposed between said pair of bearings, said bearings being disposed between said cleaning members.

10. A linear motor according to claim 9, wherein said movable piece includes a movable piece yoke covering said bearings and said armature coil.

11. A linear motor according to claim 10, wherein said yoke is made of a magnetic material.

12. A linear motor according to claim 9, wherein a non-magnetic portion is formed at a portion of said stator.

13. A linear motor comprising:
a rod-like stator having a drive field magnet extending in a uniform direction and having a first end and a second end;
a movable piece being reciprocatable along said stator and having an armature coil;
said movable piece having a pair of bearings fitted around said stator, and said armature coil being disposed between said pair of bearings, wherein a nonmagnetic portion is formed at a first end portion of said stator most distant from said second end; and
a cleaning member attached to said movable piece and a magnetic sleeve surrounding said first end portion and sized to receive said cleaning member when said movable piece approaches said first end portion.

14. A linear motor according to claim 13, further comprising a second nonmagnetic portion formed at a second end portion of said stator most distant from said first end.

15. A linear motor comprising:
a rod-like stator having a drive field magnet extending in a uniform direction; and
a movable piece being reciprocatable along said stator and having an armature coil; wherein
said movable piece has a pair of bearings fitted around said stator, and said armature coil is disposed between said pair of bearings, wherein a non-magnetic portion is formed at a portion of said stator, wherein a magnet separate from said movable piece and said stator is opposed to said non-magnetic portion to collect magnetic dust from the movable piece when the movable piece is adjacent to the non-magnetic portion of said stator.

16. An image reading apparatus, wherein first and second carriages carrying a member for optically scanning a document image and moved along a document table are included, and said second carriage is moved at a half speed of said first carriage during image scanning, comprising:
a rod-like stator having a drive field magnet extending in a uniform direction;
a movable piece including a pair of bearings fitted around said stator and an armature coil disposed between said pair of bearings, and coupled to said first carriage;
a bearing unit fitted around said stator and coupled to said second carriage;
a pair of pulleys rotatably carried by said bearing unit with said movable piece therebetween; and
a wire member retained around said pair of pulleys, and having an intermediate portion coupled to said movable piece.

17. A linear motor comprising:
a stator having a drive field magnet extending in a uniform direction and having a non-magnetic portion;
a magnet opposed to said non-magnetic portion:
a movable piece being reciprocatable along said stator and having an armature coil; and
a fitting member which is fitted around said stator, is in contact with said stator, moves together with said movable piece and is made of a non-magnetic material.

18. A linear motor according to claim 17, wherein said nonmagnetic portion is formed at a longitudinal end of said stator most distal from an opposing end of said stator.

19. A linear motor according to claim 17, wherein said fitting member is a cleaning member for cleaning said stator.

20. A linear motor according to claim 17, where in said rod-like stator includes a fine magnetic portion extending along a length of the rod-like stator for reading by an encoder.

21. A linear motor according to claim 17, wherein said drive field magnet is formed of alternately arranged North magnetic poles and South magnetic poles on said rod-like stator in a lengthwise direction thereof, said rod-like stator having a smooth and continuous surface.

22. A linear motor comprising:
a rod-like stator having a circular section, a smooth outer surface, and a drive field magnet having permanent magnetism and extending in a uniform direction, said drive field magnet being formed of alternately arranged North magnetic poles and South magnetic poles; and
a movable piece being reciprocatable along said stator and having an armature coil; wherein
said movable piece has a pair of bearings fitted around said stator, said armature coil is disposed between said pair of bearings, and a width of the bearing in the uniform direction is less than a width of each of said poles in the uniform direction.

* * * * *